(12) United States Patent
Ikeuchi et al.

(10) Patent No.: US 7,591,138 B2
(45) Date of Patent: Sep. 22, 2009

(54) PROCESS FOR PRODUCING SLUSH FLUID AND APPARATUS THEREFOR

(75) Inventors: Masamitsu Ikeuchi, Koto-ku (JP); Akito Machida, Tsukubamirai (JP); Kouichi Matsuo, Moriya (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 11/877,848

(22) Filed: Oct. 24, 2007

(65) Prior Publication Data

US 2008/0072609 A1 Mar. 27, 2008

Related U.S. Application Data

(63) Continuation of application No. PCT/JP2005/007794, filed on Apr. 25, 2005.

(51) Int. Cl.
F17C 5/00 (2006.01)
F25J 1/00 (2006.01)

(52) U.S. Cl. .......................................... 62/54.1; 62/601

(58) Field of Classification Search ................... 62/54.1, 62/601
See application file for complete search history.

(56) References Cited

U.S. PATENT DOCUMENTS

| | | | | |
|---|---|---|---|---|
| 4,009,013 | A | * | 2/1977 | Schrawer et al. ............... 62/601 |
| 4,295,346 | A | * | 10/1981 | Hoffman ...................... 62/500 |
| 5,168,710 | A | * | 12/1992 | Miyazaki ..................... 62/54.1 |
| 5,402,649 | A | * | 4/1995 | Glasser ........................ 62/54.1 |
| 6,405,541 | B1 | | 6/2002 | Brunnhofer |
| 7,155,930 | B2 | * | 1/2007 | Kawamura et al. ............. 62/601 |

FOREIGN PATENT DOCUMENTS

| | | | |
|---|---|---|---|
| JP | 6-281321 | A | 10/1994 |
| JP | 8-283001 | A | 10/1996 |
| JP | 8-285420 | A | 11/1996 |
| JP | 11-304682 | A | 11/1999 |

OTHER PUBLICATIONS

Search Report issued in corresponding PCT/JP2005/007794, mailed Aug. 2, 2005.

* cited by examiner

Primary Examiner—William C Doerrler
(74) Attorney, Agent, or Firm—Rossi, Kimms & McDowell, LLP

(57) ABSTRACT

An apparatus for producing a slush fluid wherein a liquid and solid particles are mixed together, comprising product tank (1) for storing the slush fluid (50) in its saturated condition; liquid nitrogen supply nozzle (10) provided at an upper part of the product tank (1); and compressor (15) for evacuating the interior of the product tank, which apparatus is adapted to spray a liquid in microparticulate form through the liquid nitrogen supply nozzle (10) into the product tank evacuated by the compressor (15) and to solidify the liquid particles by evaporative latent heat, thereby forming solid nitrogen (51). Preferably, the apparatus has a circulatory system for circulating the gas discharged from the product tank (1) by the compressor (15) to the liquid nitrogen supply nozzle (10), which circulatory system includes heat exchangers (13a, 13b) for heating the discharged gas to ordinary temperature by heat exchange; the compressor (15) for compressing the heated gas to thereby produce high-pressure ordinary-temperature gas; the heat exchangers (13a, 13b) for cooling the high-pressure ordinary-temperature gas to thereby produce high-pressure low-temperature gas; and auxiliary chilling refrigerator (17) and heat exchanger (16) for chilling the high-pressure low-temperature gas to thereby condense the same.

20 Claims, 3 Drawing Sheets

PROCESS FOR PRODUCING SLUSH FLUID AND APPARATUS THEREFOR

CROSS REFERENCE TO RELATED APPLICATIONS

This application is a continuation of PCT International Application PCT/JP2005/007794 (published as WO 2006/114887) having an international filing date of Apr. 25, 2005. The disclosure of the PCT application is incorporated herein by reference.

TECHNICAL FIELD

The present invention relates to a process for producing a slush fluid in which fine solid particles are intermingled in a liquid and an apparatus therefor.

DESCRIPTION OF THE RELATED ART

Heretofore, a slush fluid in which fine solid particles are intermingled in a liquid at a cryogenic temperature has been widely used in several technical fields. The slush fluid has such a feature that the density thereof is greater than that of the liquid alone by a value corresponding to the solid particles, and the heat value thereof is higher than that of the liquid by a value corresponding to the latent heat thereof. Further, since a cooled state thereof can be held in a heat insulating container for a long time, great attention has been made to the slush fluid in view of various uses such as an ice thermal storage system utilizing a dynamic ice system, a cooling system such as a super conductor equipment utilizing slush nitrogen or a hydrogen fuel storage and transfer system utilizing slush hydrogen.

A cooling system utilizing slush nitrogen will be explained as an example. Since this system utilizes the melting point (63K) of nitrogen as one characteristic feature, there has been exhibited such a feature that cooling at a lower temperature can be made, and further the cooling heat capacity is larger by a value corresponding to the latent heat (25.72 KJ/kg) of fusion thereof. Moreover, the temperature of nitrogen is constant (at 63K) until the solid portion is completely melted.

As a typical process of producing a slush fluid, there have been presented a process in which cooling is carried out by heat exchange between a fluid and helium having a cryogenic temperature through a heat transfer surface, and then solid substance sticking to the heat transfer surface is scraped so as to produce fine solid particles, and a process in which a liquid is depressurized so as to produce solid particles.

For example, Patent Document 1 (Japanese Patent Publication No. H06-281321) discloses the former process, that is, the patent document discloses a process of producing slush hydrogen, in which liquid hydrogen is led into an adiabatic container, that is, the liquid hydrogen is expanded up to a pressure not higher than the triple point pressure, and is led into the container in which the liquid hydrogen is cooled up to a super-cooled state by a super cooler using low temperature helium serving as a cooling source in order to deposit solid hydrogen at a cooling surface of the super cooler, and the thus deposited sold hydrogen is peeled off by an auger.

However, in the above-mentioned process, a helium refrigerator is required as an additional equipment, and accordingly, there has been caused such a problem that planning of a gap between a blade of the auger and the cooling surface is difficult, and further, the mechanism thereof is complicated.

In the latter process, the interior of the adiabatic container reserving therein a liquid is evacuated by a vacuum pump to the triple point so as to produce solids.

However, there has been the following problems in the case of application of the above-mentioned slush hydrogen in a cooling system:
1) The slush fluid has a pressure loss larger than that of a liquid at a low flow rate. However, it has a large absolute value of the pressure loss at a high flow rate so that its transfer efficiency deteriorates; and
2) The flow rate cannot be set to a relatively low value since solids are dissociated and deposited;

Accordingly, it is preferable that the sizes of solid particles are small and uniform.

Further, as to a long distance cooling for a superconductive power transmission cable or the like, there have been caused the following problems, in addition to the above-mentioned problems:
1) The heating value of the cable is extremely low so as to require only a relatively low flow rate; and
2) The longer the cooling distance, the larger the entrance of heat from a pump for pressurization making up for the pressure loss.

Accordingly, it is uppermost required for enhancing the efficiency by lowering the flow rate so as to reduce the pressure loss.

However, in the process of producing slush nitrogen with the use of the above-mentioned vacuum-evacuation, the solid parts created on the liquid surface by the vacuum evacuation are diffused in the liquid by agitating blades, and accordingly, the particle sizes cannot be uniformly set, some of them having larger particle sizes.

Thus, Patent Document 2 (Japanese Patent Publication No. 2003-517411) discloses a process of producing solids from liquid particles sprayed from a nozzle.

Further, Patent Document 3 (Japanese Patent Publication No. 8-285420) discloses a similar process in which the pressure in a slush hydrogen producing tank is reduced through a vacuum-evacuation line incorporated in the tank, and by spraying liquid hydrogen from a liquid hydrogen spray nozzle incorporated in the tank, the liquid hydrogen is phase-changed into solid hydrogen and reserved in the bottom part of the tank due to a latent heat of vaporization thereof. Further, after the atmospheric pressure is effected in the tank so as to emit evaporated gas through a gas exhaust line by ceasing the vacuum-evacuation, liquid hydrogen which is fed from the liquid hydrogen spray nozzle is mixed therewith in order to produce slush nitrogen. Thus, it is suggested that fine particles having uniform particle sizes can be produced.

Patent Document 1: Japanese Patent Publication No. H6-281321

Patent Document 2: Japanese Patent Publication No. 2003-517411

Patent Document 3: Japanese Patent Publication No. H8-285420

DISCLOSURE OF THE INVENTION

Problems to be Solved by the Invention

However, in the process disclosed in patent document 2, helium gas is used for cooling liquid particles, and accordingly, mixing of helium into a produced slush fluid is inevitably caused. Similarly, the process disclosed in the patent document 3 causes mixing of another substances with a higher degree of possibility during the production, and in this case, those having a temperature higher than a melting point of a substance forming a slush fluid are solidified and stuck to a wall surface while those having a temperature lower than a boiling point thereof is dissociated in the form of gas and is pooled at a higher level. Anyway, the obstruction to a transfer pipeline would be caused in both cases.

Further, in the patent document 3, since gas exhausted through the exhaust line is emitted into the atmosphere, a problem of low efficiency is caused. Further, in the patent document 3, after the creation of the solid hydrogen from the liquid hydrogen sprayed from the nozzle, if the vacuum evacuation is ceased so as to aim at increasing the pressure, the temperature of the hydrogen in the nozzle output is raised, as a result, there is caused a problem of melting the solid hydrogen.

Thus, the present invention is devised in view of the above-mentioned problems, and accordingly, an object of the present invention is to provide a process of producing a slush fluid, and an apparatus therefor, which can surely produce a slush fluid containing fine solid particles of uniform particle sizes, and which can prevent impurities from being mixed thereinto so as to produce and transfer the slush fluid with a high degree of efficiency and with a high degree of reliability.

Means for Solving the Problems

To solve the above mentioned problems, according to the present invention, there is provided a process of producing a slush fluid in which a liquid and solid particles are mixed together, having the steps of initially charging the liquid into an adiabatic container, vacuum-evacuating an inside of the adiabatic container to a triple-point pressure of the liquid and thereafter, spraying a liquid in the form of fine particles into the adiabatic container by a liquid supply means so as to solidify the liquid due to its latent heat of evaporation so as to create solid particles, and mixing the created solid particles with the initially charged liquid so as to produce a slush fluid.

In the present invention, since the liquid is initially charged beforehand in the container, the liquid particles sprayed in the adiabatic container is cooled to the triple point by vacuum-evacuating the adiabatic container, thereby it is possible to produce the solid particles. At this time, the initially charge liquid preferably has a saturation temperature, and accordingly it can be conveniently cooled down up to the triple point only by vacuum-evacuation in order to create the solid particles. Further, by providing the liquid supply means for spraying a liquid in the form of fine particles so as to form solid particles, it is possible to control the particle sizes. As a result, there can be produced a slush fluid containing solid particles of extremely fine and uniform particle sizes. Thus, in a case where the produced slush fluid is used as a refrigerant in a cooling system, efficient transfer and cooling can be made without dissociation and deposition of solids.

Further, in the present invention, a gas-liquid separating heat-insulation material for preventing the liquid from being evaporated or solidified, is preferably provided on the liquid surface of the liquid initially charged in the adiabatic container.

By providing the a gas-liquid separating heat-insulation material, the evaporation and solidification of the initially charged liquid can be prevented, so that the creation of solid particles having larger particle sizes which would otherwise be created by the solidification of the liquid reserved in the container, can be prevented, thereby it is possible to produce a slush fluid containing therein solid particles having fine and uniform particle sizes.

Further, it is preferable that the vacuum-evacuated gas is cooled, after being compressed, so as to be condensated and reliquefied, and the reliquefied liquid is fed into the liquid supply means for circulation.

Further, it is also preferable that the vacuum-evacuated gas having a low pressure and a low temperature is compressed by a compressor, after being heated by a heat-exchanger, so as to create a high-pressure and medium-temperature gas, the gas having a lower pressure and a medium temperature being then cooled through heat-exchange with the above-mentioned gas having a low pressure and a low temperature in the heat-exchanger, and the liquid condensated and reliquefied by the cooling is fed into the liquid supply means for circulation. It is noted that the medium temperature means around the ordinary temperature, and is preferably the ordinary temperature.

In view of the above-mentioned inventions, the quantity of the gas emitted outside can be restrained to a minimum value by condensating and reliquefying gas for circulation, thereby it is possible to efficiently utilize the gas. Further, with the use of the compressor, instead of a pump, upon depressurization, transfer with a high degree of accuracy can be made. Further, with such a configuration that the heat-exchange between the gas having a low pressure and a low temperature and the gas having a high pressure and a medium temperature in the heat-exchanger is carried out, it is possible to enhance the thermal efficiency. Further, since the gas introduced into the compressor is once heated before the introduction thereof, occurrence of a defect in the apparatus due to a low temperature condition can be prevented as possible as it can, and further since a drive unit other than an auxiliary cooling equipment is not required to be provided in a cryogenic temperature part, it is possible to reduce the cost of the equipment.

Moreover, according to another aspect of the present invention, impurity gas is removed from the vacuum-evacuated gas.

Thus, the concentration of impurities in the system can be maintained at an extremely low value, and a defect caused by mixed impurities can be avoided even though the produced slush fluid is used in a cooling system or the like, thereby it is possible to provide a cooling system with a high degree of efficiency and a high degree of reliability.

Further, an apparatus of the present invention for producing a slush fluid in which a liquid and solid particles are mixed together includes an adiabatic container in which the liquid is initially charged, a depressurizing means for vacuum-evacuating the inside of the adiabatic container to a triple point pressure of the liquid, a liquid supply means for spraying a liquid in the form of fine particles into a gas phase in the vacuum-evacuated adiabatic container, and an agitating means for agitating the mixture of the initially charged liquid and solid particles created through the solidification of the sprayed liquid due to the latent heat of evaporation thereof.

In this case, it is preferable to provide a gas-liquid separating heat-insulation material for preventing the liquid from being evaporated or solidified, on the liquid surface of the initially charged liquid in the adiabatic container.

Further, it is preferable to provide a heat-exchanger for heating a gas having a low pressure and a low temperature, which is produced by vacuum-evacuating adiabatic container by the depressurizing means, and a compressor for compressing the heated gas so as to obtain a gas having a high pressure and a medium temperature, the gas having a high pressure and a medium temperature being heat-exchanged with the gas having a low pressure and a low temperature in the heat-exchanger so as to be cooled, thereby forming a circulation line for circulating the liquid condensated and liquefied by the cooling into the liquid supply means.

Further, an auxiliary cooling means for cooling the gas having a high pressure and a medium temperature may be provided in addition to the above-mentioned heat-exchange.

Further, an impurity gas removal means for removing impurity gas from the vacuum-evacuated gas is preferable to be provided.

Further, the invention may be constructed to have a dual structure in which an inner container is accommodated in the adiabatic container, the inner container being vertically movable relative to the adiabatic container and incorporating a liquid communication valve in a lower part thereof. In the invention, when creating the solid particles, the inner container is raised so that substantially no liquid is present in the inner container, and then the liquid communication valve is closed. The liquid communication valve is opened after the created solid particles are reserved in the inner container by a predetermined quantity while the inner container is lowered in order to mix the liquid initially charged in the adiabatic container with the created solid particles for producing a slush fluid, and the inner container is raised again so as to displace the slush fluid into the adiabatic container through the liquid communication valve in order to pressurize and transfer the slush fluid. Consequently, it is possible to ensure the gas-liquid separation during being pressurized in the adiabatic container.

Further, according to another aspect of the present invention, it is constructed to have a dual structure in which an inner container is accommodated in the adiabatic container, the inner container being vertical movable relative to the adiabatic container and being provided in the bottom part thereof with a liquid communication valve and being also provided therein with an agitator. In the invention, while creating the solid particles, the inner container is lowered and the liquid communication valve is closed in a condition that the initially charged liquid is present in the inner container. Further, a gas-liquid separating heat-insulating material is provided on the liquid surface of the liquid, the created solid particle and the liquid being agitated and mixed together so as to produce a slush fluid, and the liquid communication valve is opened when the concentration of the slush fluid reaches up to a predetermined value while the inner container is raised so as to displace the slush fluid into the adiabatic container in order to transfer the slush fluid in a pressurized state. With this configuration, the gas-liquid separation can be ensured while the inside of the adiabatic container is pressurized, and further, the solid particles can be prevented from being adhered among them.

Advantages of the Invention

As stated above, according to the present invention, it is possible to produce a slush fluid having particles of fine and uniform sizes with a simple configuration. Further, with such a configuration that the vacuum-evacuated gas is reliquefied so as to be used in circulation, the degree of emission of the gas is restrained to a minimum value in order to enable effective use thereof. Further, by means of providing the impurity gas removal means in the circulation system, the concentration of impurities in the circulation system can be maintained at a low value. Further, occurrence of a defect caused by intermixing of impurities can be avoided even though the produced slush fluid is used in a cooling system or the like, thereby it is possible to provide a system with a high degree of efficiency and a high degree of reliability. Further, due to the configuration that the gas-liquid separating heat-insulating material is provided in the adiabatic container, it is possible to prevent the initially charged liquid from being evaporated or solidified.

EXPLANATION TO REFERENCE NUMERALS

1 . . . Slush Nitrogen Producing Tank (Adiabatic Container)
3 . . . Agitator
6 . . . Agitating Blade
8 . . . Heat-Insulation Material for Gas-Liquid Separating
9 . . . Gas-Liquid Separator
10 . . . Liquid Nitrogen Supply Nozzle
11 . . . Vacuum Exhaust Line
12 . . . Pressurized Pressure Regulation Line
13a, 13b . . . Heat-Exchanger
15 . . . Compressor
16, 18 . . . Heat-Exchanger
17 . . . Auxiliary Cold-Type Refrigerator
19 . . . Liquid Nitrogen Supply Line (Vacuum Heat-Insulation Pipe)
20, 21 . . . Impurity Removal Equipment
34 . . . Buffer Tank
40, 44 . . . Inner Container for Gas-Liquid Separating
41, 42 . . . Seal Member
43 . . . Liquid Communication Valve
50 . . . Liquid Nitrogen
51 . . . Solid Nitrogen

BEST MODE FOR CARRYING OUT THE INVENTION

Detailed explanation will be made of preferable exemplified embodiments of the present invention with reference to the accompanying drawings. It is noted here that dimensions, materials, shapes and the like of components described in these embodiments are only of exemplified examples, and accordingly, it should not be intended that the technical scope of the present invention is limited to these unless otherwise specified.

These embodiments relates a process of producing a slush fluid as a sherbet-like fluid in which a liquid and fine particles are mixed together, and the apparatus therefor, and for example, nitrogen, oxygen, hydrogen or helium is used and there may be exemplified, in its fluid form, a dynamic ice, a slush nitrogen or a slush hydrogen. Hereafter, the process and apparatus for producing slush nitrogen will be described as an example, however it should not be limited to slush nitrogen.

Embodiment 1

Figure 1:
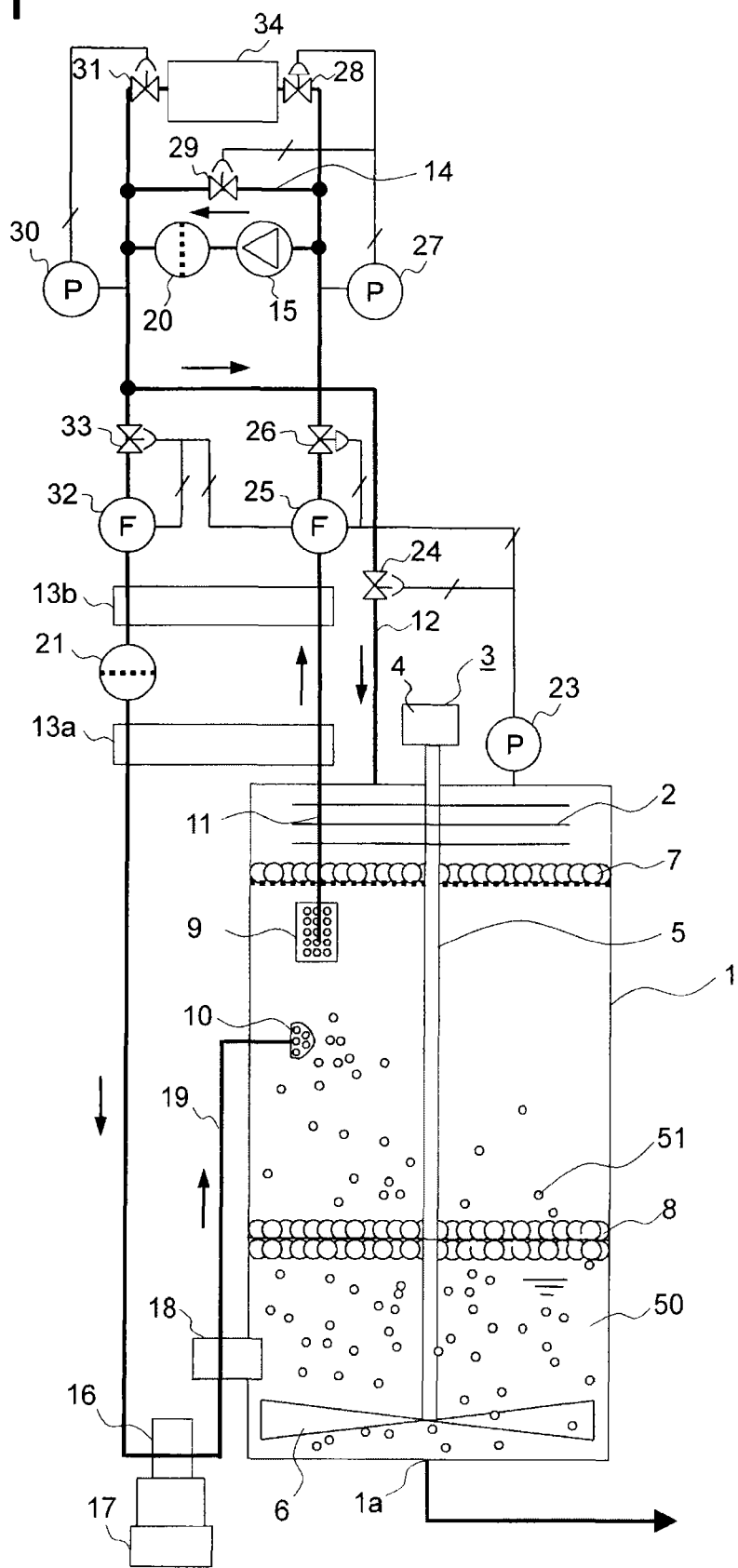
FIG. 1 is a view illustrating an overall configuration of a slush nitrogen producing apparatus in an embodiment 1 of the present invention.

As shown in FIG. 1, a slush fluid producing apparatus in this embodiment is composed of a slush nitrogen production system including a vacuum heat-insulation type slush nitrogen production tank 1, a nitrogen circulation system for liquefying nitrogen gas vacuum-evacuated from the production tank 1 then returning back into the production tank 1.

In the above-mentioned slush nitrogen production system, solid nitrogen 51 is created from liquid nitrogen 50 in the production tank 1, and the liquid nitrogen 50 is mixed with a liquid initially charged in the production tank 1 so as to produce slush nitrogen.

In a specific form of the above-mentioned production tank 1, a plurality of baffle discs 2 are stacked in layers and fixed, in the top part of the production tank 1, and an agitator 3 is inserted in the production tank 1 along the center axis of the tank. The agitator 3 is composed of agitating blades 6 provided in the lower end part of a shaft 4 which is coupled to a motor. The agitating blades 6 are arranged so as to agitate slush nitrogen reserved in the bottom part of the production tank 1. Further, the production tank 1 is provided in its gas phase part with a gas-liquid separator 9 through which only gas presented in the gas phase part is emitted outside. Further, the above-mentioned production tank 1 is incorporated therein with a vacuum exhaust line 11 for externally exhausting gas separated by the gas-liquid separator 9. The production tank 1 is incorporated in its bottom part with a slush nitrogen take-out port 1a for discharging the slush nitrogen produced in the production tank 1.

The production tank 1 is provided in its gas phase part with a liquid nitrogen supply nozzle 10 for spraying liquid nitrogen in the form of fine particles. The liquid nitrogen supply nozzle 10 is connected to a liquid nitrogen supply line 19 extended from the above-mentioned nitrogen circulation system. A space in the top part of the production tank, including the baffle discs 2, is isolated by a heat-insulation material 7 through which gas permeates. The isolated top part of the production tank 1 is provided therein with a line 12 for pressurization and pressure regulation in the production tank 1.

The above-mentioned circulation system recompresses the nitrogen gas exhausted from the production tank 1 through the vacuum exhaust line 11, by means of a compressor 15, and then the nitrogen gas is condensated and reliquefied, and is circulated into the production tank 1 in the form of liquid nitrogen through the liquid nitrogen supply pipe line 19.

The above-mentioned vacuum exhaust line 11 is provided therein with heat-exchangers 13a, 13b for heating the exhausted nitrogen up to an ordinary temperature through heat-exchange, and is also provided therein with a compressor 15 into which the heated gas having a low pressure and an ordinary temperature is led. The nitrogen gas is pressurized by the compressor 15 so as to be turned into a gas having a high pressure and an ordinary temperature, and is introduced again in the heat-exchangers 13b, 13a so as to be cooled through heat-exchange with the nitrogen gas from the vacuum exhaust line 11 in order to create a gas having a low temperature and a high pressure. Further, it is provided with a heat-exchanger 16 into which the gas having a low temperature and a high pressure is introduced. An auxiliary cold type refrigerator 17 is provided to the heat-exchanger 16. In the heat-exchanger 16, the gas having a low temperature and a high pressure is condensated and liquefied so as to be turned into liquid nitrogen. There may be provided a heat-exchanger 18 for cooling the slush nitrogen in the production tank 1 by means of the cooled liquid nitrogen, downstream of the heat-exchanger 16. The liquid nitrogen having been liquefied through the heat-exchanger 16 is fed into the liquid nitrogen supply nozzle 10 in the production tank 1 by way of the liquid nitrogen supply line 19.

Further, there is provided an impurity gas removal equipment 20 for removing impurity gas from the nitrogen gas on the outlet side of the compressor 15. Similarly, a low temperature impurity gas removal equipment 21 is also provided between the heat-exchanger 13b and the heat-exchanger 13a, downstream of the compressor 15. Only one impurity gas removal equipment 21 may be provided, but a plurality of impurity gas removal equipments 21 may also be provided. Further, the positions where they are arranged should not be specifically limited.

Further, a buffer tank 34 for temporarily reserving the nitrogen gas having passed through the vacuum exhaust line is preferably provided, being connected in parallel with the compressor 15. Further, there may be provided a bypass line 14 for causing the nitrogen gas having passed through the vacuum exhaust line 11 to bypass the compressor 15 and the buffer tank 34 so as to be fed into the heat-exchanger 13b.

Further, a production tank pressure gauge 23 for measuring a pressure in the production tank 1 and a pressurizing pressure regulator valve 24 for controlling the pressure in the tank in accordance with the tank pressure measured by the pressure gauge 23 are provided.

Further, an exhaust gas flow meter 25 and a production tank pressure regulator valve 26 are provided in the vacuum pipe line 11 between the heat-exchanger 13b and the compressor 15, and a low pressure side pressure gauge 27 is also provided therein. Further, there are provided a low pressure quantity regulator valve 28 for regulating the quantity of gas flowing into the buffer tank 34 in accordance with a pressure of nitrogen gas measured by the low pressure side pressure gauge 27, and a bypass regulating vale 29 for regulating a quantity of gas flowing through the bypass line 14.

Further, there are provided a high pressure side pressure gauge 30 for measuring a pressure of nitrogen gas flowing through the compressor 15, the buffer tank 34 or the bypass line 14, and a high pressure regulator valve 31 for controlling a quantity of gas transferred from the buffer tank 34 in accordance with a pressure of nitrogen gas measured by the pressure gauge 30. Further, there are provided a supply gas flow meter 32 for measuring a flow rate of the gas having a high pressure and an ordinary pressure which flows downstream of the high pressure regulator valve 31 before it is led into the heat-exchanger regulator valve 31b, and a supply gas flow regulator valve 33 for controlling the flow rate of gas in accordance with a flow rate measured by the flow meter 32.

Next, explanation will be made of the working of the slush fluid production apparatus having the above-mentioned configuration.

Nitrogen gas which has been vacuum-evacuated from the production tank 1 by the compressor 15, flows through the gas-liquid separator 9 and the heat-exchangers 13a, 13b by way of the vacuum exhaust line 11 and is therefore heated up to an ordinary temperature so as to be introduced into the compressor 15 as a gas having a lower pressure and an ordinary temperature. The gas pressurized in the compressor 15 is led into the impurity gas removal equipment 20 for removing steam and impurity gas therefrom, and is again led into the heat-exchangers 13b, 13a in which the gas is cooled so as to be turned into a gas having a high pressure and a low temperature. At this stage, steam and impurity gas are again removed in the lower temperature impurity gas removal equipment 21, and accordingly, the gas is refined into a gas of highly pure nitrogen. Thereafter, the gas is cooled and condensated in the heat-exchanger 16 up to about 63 K which is a freezing point of nitrogen, and is accordingly liquefied and transferred through the liquid nitrogen supply pipe line 19 into the liquid nitrogen supply nozzle 10, from which the liquid nitrogen is sprayed into the production tank 10 in the form of fine particle-like droplets. At this time, the liquid nitrogen 50 having a saturation temperature has been initially charged in the production tank, beforehand.

In the above-mentioned cycle, a gas quantity of gas sucked from the gas-liquid separator 9 and a liquid quantity of liquid nitrogen sprayed from the liquid nitrogen supply nozzle 10 are set to be equal to each other (in view of mass conversion) so as to balance the heat value for creating the solid nitrogen 51 in the production container 1 with a heat value which is carried away by cooling water in the compressor 15, thereby it is possible to greatly reduce a load exerted upon the auxiliary cold type refrigerator 17.

The liquid nitrogen 50 initially charged in the production tank 1 is either fed externally or from the buffer tank 34 in the form of nitrogen gas which is therefore liquefied in the auxiliary cold type refrigerator 17 before it is led into the production tank 1 in such a condition that its pressure is not lower than the triple point of nitrogen. Further, extra nitrogen may be collected into the buffer tank 34.

The liquid nitrogen having 63K and a particle size of, for example, 1 mm, and sprayed from the liquid supply nozzle 10, is solidified by removal of the latent heat of evaporation thereof, so as to be turned into the solid nitrogen 51 in the form of fine particles having a particle size of about 0.9 mm. At this time, should evaporation occur also from the surface of the liquid nitrogen 50 initially changed in the lower part of the production tank 1, the solid nitrogen having large particle sizes would be created. Thus, the gas-liquid separating heat-insulation material 8 having a density lower than that of the liquid nitrogen 50, such as several small balls made of polymeric resin, are laid in order to allow the surface of the liquid nitrogen to be covered thereover with the material 8. Thus, the evaporation from the liquid surface is inhibited, and accordingly, the droplets sprayed from the liquid nitrogen supply nozzle 10 are preferentially solidified, and pour onto the gas-liquid separating heat-insulation material 8. At this time, the agitator 3 is continuously or intermittently operated so as to agitate the liquid nitrogen 50 in the production tank 1. The rotation of the agitator 3 causes rotation of the fine-particle-like solid nitrogen 51 built up on the top part of the gas-liquid separating heat-insulation material 8, and accordingly, the solid nitrogen 50 enters into the liquid nitrogen 50. Further, the liquid nitrogen 50 and the solid nitrogen 51 are agitated and mixed together by the agitator 3, and accordingly, uniform slush nitrogen is produced. At this time, it is preferable to measure a pressure in the production tank 1 with the use of the production tank pressure gauge 23 so as to control the production tank pressure regulator valve 26 in accordance with the measured pressure in order to appropriately regulate the pressure in the production tank 1. Further, the spraying quantity of the liquid nitrogen supply nozzle 10 is regulated by the supply gas flow rate regulator valve 33, and accordingly, it is possible to set up an optional production capacity.

When the mass density of the solid substance in the production tank 1 comes up to a specific value, the above-mentioned both valves 26, 33 are closed, and nitrogen gas is fed into the production tank 1 from the pressurizing pressure regulator valve 24. At this time, since the gas-liquid separating heat-insulation material 8 prevents the slush nitrogen having a low temperature from making contact with the pressurized gas, liquefaction of the fed gas is prevented so that the pressure in the production tank 1 can be raised. When the pressure comes up to a set value, the slush nitrogen is taken out from the take-out port 1a, and is then transferred to a desired destination for utilization. When the production tank 1 becomes empty, the liquid nitrogen 50 is charged directly in the production tank 1 or the gas is liquefied in the auxiliary cold type refrigerator 17 and is then fed into the production tank 1. Further, the vacuum evacuation is started again, and accordingly, the temperature of the liquid is lowered to a triple point thereof.

Thus, according to this embodiment, due to the provision of the heat-exchangers 13a and 13b for heat-exchange between a gas having a low pressure and a low temperature and evacuated from the production tank 1 and a gas having a high pressure and an ordinary temperature which are pressurized by the compressor 15, the thermal efficiency can be enhanced. Further, during steady-state operation, the capacity of the auxiliary cold type refrigerator can be less or such refrigerator is not required. Further, since the reservation of unnecessary nitrogen is made by the buffer tank 34 in the form of a gas, no extra refrigeration load is caused in comparison with a liquid storage. Further, with the provision of the impurity gas removal equipment, the concentration of impurities may be maintained at an extremely low value, and accordingly, the slush nitrogen having a high degree of purity of nitrogen can be produced. Moreover, with the provision of the liquid nitrogen supply nozzle 10 for spraying fine particle-like liquid nitrogen, the particle sizes of solid nitrogen can be controlled, thereby it is possible to produce slush nitrogen having extremely fine solid particles having uniform particle sizes. Further, due to the transfer of the slush under pressurization, it is possible to carry out the transfer with a high degree of efficiency in comparison with the transfer using a pump. Further, no drive unit other than the auxiliary cold type refrigerator is present in the low temperature part, and accordingly, occurrence of a defect can be retrained to a minimum value, and the costs of the apparatus can be reduced.

Embodiment 2

Figure 2:
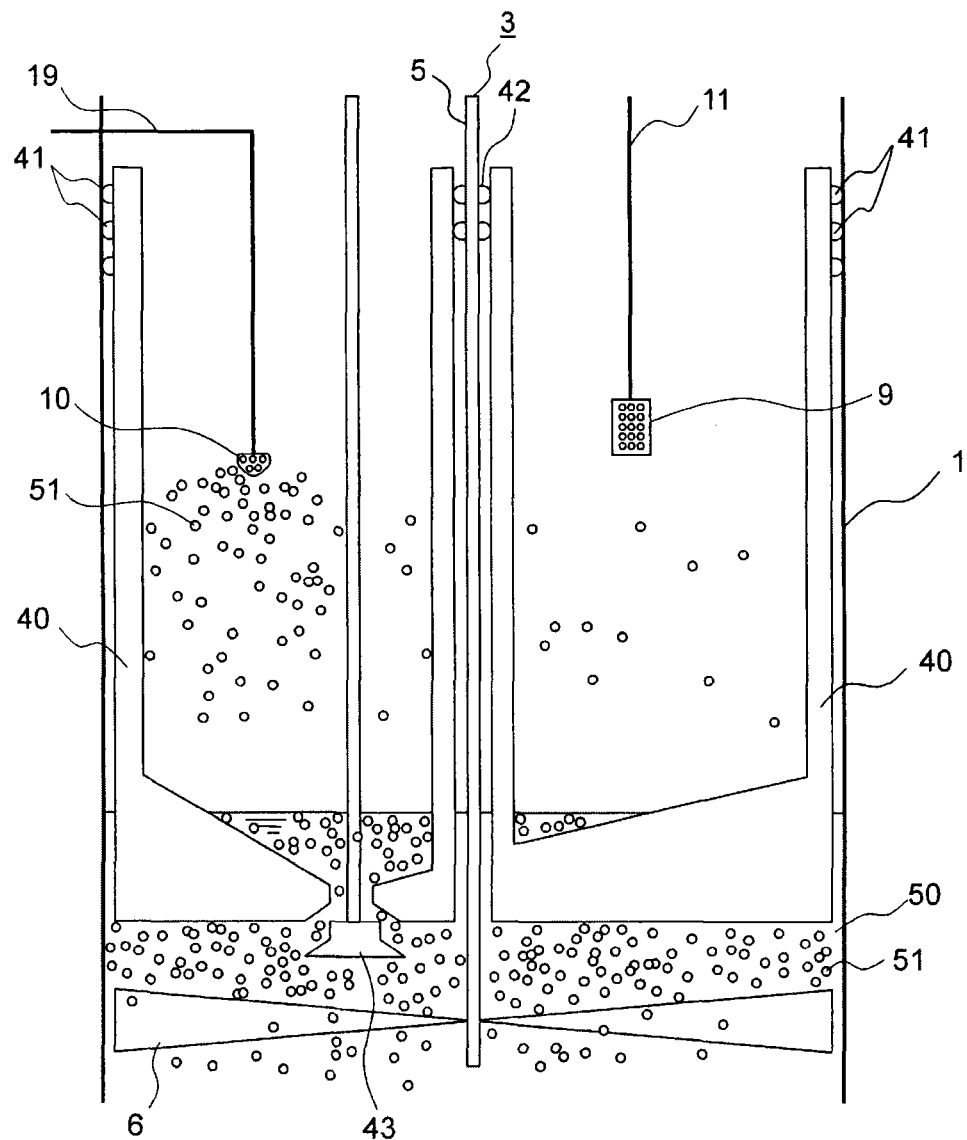
FIG. 2 is a sectional view illustrating a configuration of another production tank, in an embodiment 2, incorporated in the slush nitrogen producing apparatus shown in FIG. 1.

FIG. 2 shows a production tank 1 in the embodiment 2, which has a configuration different from that shown in FIG. 1. This embodiment 2 is arranged to carry out the gas-liquid separation during the pressurization in the production tank 1 shown in the embodiment 1, in a more surely manner.

The embodiment 2 has a dual structure composed of a slush nitrogen producing tank 1 in the form of a vacuum adiabatic tank, and an inner container 40 for gas-liquid separation, provided in the production tank 1. The inner container 40 is of a vacuum adiabatic type, and is provided in a floating condition in the liquid nitrogen 50 reserved in the production tank 1 so as to be vertically movable. Accordingly, no liquid is normally present in the inner container 40. The inner container 40 is separated from the production tank 1 so as to be freely movable by its buoyancy, and the inside and the outside of the container are sealed against each other in the ordinary temperature part in the top portion thereof, that is, the gap between the side walls of the production tank 1 and the inner container 40 is sealed by mans of seal members 41. Further, the inner container 40 is provided in its bottom part with a liquid communication valve 43 which is normally closed. Further, similar to the embodiment 1, the production tank 1 (the inner container 40) is provided in its gas phase part with a liquid nitrogen supply nozzle 10 connected to the liquid nitrogen supply line 19 and a gas-liquid separator 9 connected to the vacuum exhaust line 11, which are arranged so as to avoid interfering with the adiabatic container 40. Further, an agitator 3 is provided along the center axis of the production tank 1, having a shaft 5 piercing through the inner container 40, and coupled in its lower end part with agitating blades 6 which are located between the production tank 1 and the inner container 40. The ordinary temperature part in the top part of the shaft 5 of the agitator 3 is sealed by seal members 42.

In this embodiment, the inner container 40 floats in the initially charged liquid nitrogen 50 upon creation of solid nitrogen 51 while the liquid communication valve 43 is closed. Substantially no liquid nitrogen is present in the inner container 40 before production of the solid nitrogen. Due to vacuum evacuation from the vacuum exhaust line 11, the inner container is depressurized by vacuum-evacuation up to a value not higher than the triple point pressure of nitrogen, and thereafter, the liquid nitrogen is sprayed from the liquid nitrogen supply nozzle 10 in the form of fine particles within the inner container 40. The sprayed nitrogen is solidified so as to be turned into the solid nitrogen 51 in the form of fine particles, and is reserved in the inner container 40. When the solid nitrogen 51 is reserved by a certain degree, the liquid communication valve 36 is opened and simultaneously, the inner container 40 is submerged by holding the top part thereof in order to allow the liquid nitrogen in the production tank 1 to flow into the inner container 40.

When all solid nitrogen 51 in the inner container 40 has been introduced into the liquid nitrogen 50, the inner container 40 is pulled up while the liquid communication valve 43 is opened, and accordingly, the solid nitrogen 51 is displaced into the production container 1 along with the liquid nitrogen flowing out therefrom. With the repetitions of the above-mentioned steps until the solid nitrogen comes up to a predetermined quantity in the production tank 1, it is possible to produce slush nitrogen with a predetermined concentration in the production container 1. Upon the transfer of the produced slush hydrogen, the liquid communication valve 36 is closed after the inner container 40 is pulled up, and the interior of the production container 1 is pressurized with the liquid feed valve 36 still closed. Alternatively, the slush nitrogen is pressurized by depressing the inner container 40 downward. Thus, the slush nitrogen can be transferred.

It is noted that by beforehand cooling the liquid nitrogen 50 to its freezing point in the auxiliary cold type refrigerator 17, more efficient operation can be made.

Thus, in this embodiment, the gas-liquid separation of the inner container 40 can be surely made.

Embodiment 3

Figure 3:
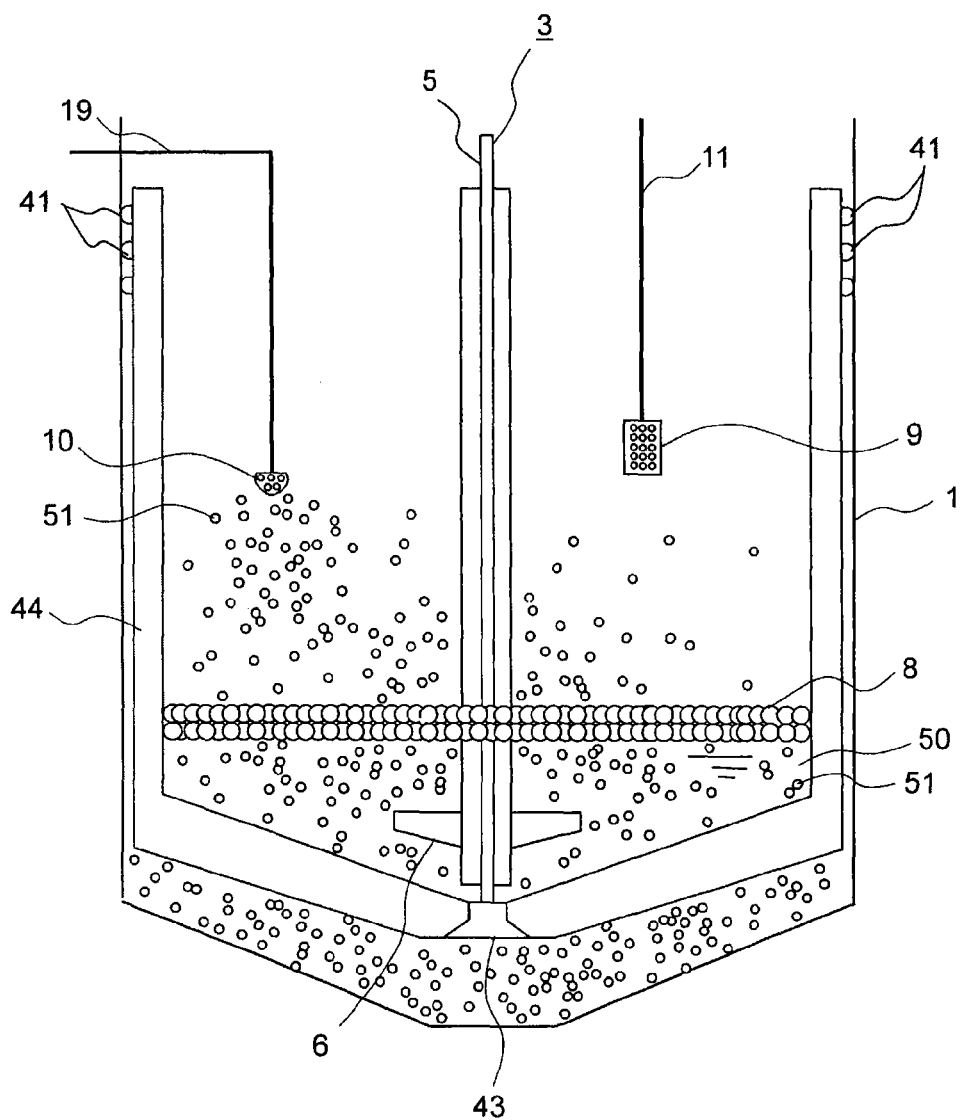
FIG. 3 is a sectional view illustrating a configuration of another production tank, in an embodiment 3, incorporated in the slush nitrogen producing apparatus shown in FIG. 1.

FIG. 3 shows a production tank 1 in an embodiment 3, which has a configuration different from that in the embodiment 1. In this embodiment 3, explanation will be made of a configuration which can eliminate such a risk, inherent to the production tank 1 explained in the embodiment 2, that should the solid nitrogen 51 alone be reserved in the inner container 40, the solid nitrogen particles would be stuck to one another, depending upon a certain operating condition.

The embodiment 3 has a dual structure composed of a slush nitrogen production tank 1 in the form of a vacuum adiabatic container, and an inner container 44 for gas-liquid separation, which is provided in the production container 1. The inner container 44 is of a vacuum adiabatic type, and is separated from the production tank 1, and is provided so as to be vertically movable. An ordinary temperature part defined in the top portion of the inner container 44 is sealed against the inside and outside thereof by sealing members 41. Further, the inner container 44 is provided in its bottom part with a liquid communication valve 43 which is normally closed. Further, similar to the embodiment 1, a phase part in the production tank 1 (the inner container 44) is provided therein with a liquid nitrogen supply nozzle 10 connected to the liquid nitrogen supply line 19 and a gas-liquid separator 9 connected to the vacuum exhaust line 11, which are arranged so as to avoid interfering with the inner container 44. Further, an agitator 3 is provided along the center axis of the production tank 1, having a shaft 5 provided at its lower end part with agitating blades 6 which are located in the bottom part of the inner container 44.

In this embodiment, upon creation of the solid nitrogen 51, the inner container 44 is located at the lowermost part of the production tank 1 while the liquid feed valve 43 is closed. A gas-liquid separating heat-insulation material 8 floats so that the allover liquid surface of the liquid nitrogen is covered therewith, and accordingly, the initially charged liquid nitrogen 50 and the phase part are separated from each other by the material. Due to vacuum evacuation from the vacuum exhaust line 11, the inside of the container 44 is depressurized to a triple point pressure of nitrogen, and thereafter, the liquid nitrogen is sprayed from the liquid nitrogen supply nozzle 10 in the form of fine particles into the inner container 44. The sprayed liquid nitrogen is solidified due to a latent heat of evaporation so as to be turned into the solid nitrogen 51 which is then falls onto the gas-liquid separating heat-insulation material 8 so as to be built up thereon. Since the gas-liquid separating heat-insulation material 8 is rotated by the agitator 3, and accordingly, the solid nitrogen on the gas-liquid separating heat-insulation material 8 passes through this material, and then enters into the liquid nitrogen 50. When slush nitrogen having a predetermined concentration is obtained, the inner container 44 is pulled up while the liquid communication valve 43 is opened. Thus, the slush nitrogen produced in the inner container 44 flows into a space in the production tank 1, from which the inner container 44 is shifted. When all slush nitrogen has flown into the tank 1, the upward movement of the inner container 44 is stopped while the liquid communication valve 43 is closed. By pressurizing the inner container 44 or pushing down the same thereafter, a predetermined pressure is effected so as to transfer the slush nitrogen.

Thus, in this embodiment, it is possible to prevent occurrence of adhesion of the solid nitrogen caused by reserving the solidified and created solid nitrogen 51, and it is also possible to produce slush nitrogen containing fine particles having uniform particle sizes.

INDUSTRIAL APPLICABILITY

The present invention can simply produce slush nitrogen from various substances including nitrogen, oxygen, hydrogen and helium, and can also produce slush fluid containing fine solid particles having uniform particle sizes. Thus, it is possible to use the produced slush fluid in any of various purposes, such as an ice regenerative system using a dynamic ice system, a super conductive equipment using a slush nitrogen, or a hydrogen fuel storage and transfer system using slush hydrogen.

The invention claimed is:

1. A process of producing a slush fluid in which a liquid and solid particles are mixed together, comprising the steps of:
   charging an adiabatic container with an initial charge liquid,
   vacuum-evacuating gas from an inside of the adiabatic container to be depressurized to a value not higher than a triple point pressure of the initial charge liquid,
   condensating the vacuum-evacuating gas to create additional liquid;
   spraying the additional liquid in the form of fine particles into the adiabatic container by a liquid supply system so as to solidify the additional liquid due to a latent heat of evaporation in order to create solid particles, and mixing the created solid particles with the initial charge liquid so as to produce a slush fluid.

2. A process of producing a slush fluid in which a liquid and solid particles are mixed together, comprising the steps of:
- charging an adiabatic container with an initial charge liquid,
- vacuum-evacuating an inside of the adiabatic container to be depressurized to a value not higher than a triple point pressure of the initial charge liquid,
- spraying additional liquid in the form of fine particles into the adiabatic container by a liquid supply means so as to solidify the additional liquid due to a latent heat of evaporation in order to create solid particles, and
- mixing the created solid particles with the initial charge liquid so as to produce a slush fluid,
- wherein a gas-liquid separating heat-insulation material for preventing evaporation or solidification of the initial charge liquid is provided on the liquid surface of the initial charge liquid in the adiabatic container.

3. A process of producing a slush fluid according to claim 2, wherein a circulation is performed such that the vacuum-evacuated gas is cooled after being compressed so as to be condensated and fed into the liquid supply means.

4. A process of producing a slush fluid according to claim 2, wherein a circulation is performed such that the vacuum-evacuated gas having a low pressure and a low temperature is heated by a heat-exchanger and thereafter compressed by a compressor so as to become a gas having a high pressure and a medium temperature, which is heat-exchanged with the gas having a low pressure and a low temperature in the heat-exchanger so as to be condensated by being cooled and fed into the liquid supply means.

5. A process of producing a slush fluid according to claim 3, wherein impurity gas is removed from the vacuum-evacuated gas.

6. A process of producing a slush fluid according to claim 4, wherein impurity gas is removed from the vacuum-evacuated gas.

7. An apparatus for producing a slush fluid in which a liquid and solid particles are mixed together, comprising;
- an adiabatic container charged with an initial charge liquid,
- a depressurizing device that vacuum-evacuates gas from an inside of the adiabatic container to a value not higher than a triple point pressure of the initial charge liquid,
- a liquid supply system that condenses the vacuum-evacuated gas to form additional liquid and sprays the additional liquid in the form of fine particles into a phase part in the vacuum-evacuated adiabatic container, and
- an agitating device that agitates a mixture of the initial charge liquid and solid particles which are created from the sprayed additional liquid that is solidified due to a latent heat of evaporation.

8. An apparatus for producing a slush fluid in which a liquid and solid particles are mixed together, comprising;
- an adiabatic container charged with an initial charge liquid,
- a depressurizing means for vacuum-evacuating an inside of the adiabatic container to a value not higher than a triple point pressure of the initial charge liquid,
- a liquid supply means for spraying additional liquid in the form of fine particles into a phase part in the vacuum-evacuated adiabatic container, and
- an agitating means for agitating a mixture of the initial charge liquid and solid particles which are created from the sprayed additional liquid that is solidified due to a latent heat of evaporation,
- wherein a heat-insulation material for gas-liquid separating, for preventing the initial charge liquid from being evaporated or solidified, is provided on the liquid surface of the initial charge liquid in the adiabatic container.

9. An apparatus for producing a slush fluid according to claim 8, wherein there are provided with a heat-exchanger for heating the gas having a low pressure and a low temperature, which has been obtained by vacuum-evacuating the inside of the adiabatic container by the depressurizing means, and a compressor for compressing the heated gas so as to obtain a gas having a high pressure and a middle temperature, the gas having a high pressure and a middle temperature being heat-exchanged with the gas having a low pressure and a low temperature in the heat-exchanger for cooling, thereby forming a circulation line for circulating the liquid condensated by the cooling into the liquid supply means.

10. An apparatus for producing a slush fluid according to claim 9, wherein an auxiliary cooling means for cooling the gas having a high pressure and a medium temperature is further provided in addition to the heat-exchanger.

11. An apparatus for producing a slush fluid according to claim 9, wherein an impurity gas removal means for removing impurity gas from the vacuum-evacuated gas is provided.

12. An apparatus for producing a slush fluid in which a liquid and solid particles are mixed together, comprising;
- an adiabatic container charged with an initial charge liquid,
- a depressurizing means for vacuum-evacuating an inside of the adiabatic container to a value not higher than a triple point pressure of the initial charge liquid,
- a liquid supply means for spraying additional liquid in the form of fine particles into a phase part in the vacuum-evacuated adiabatic container,
- an agitating means for agitating a mixture of the initial charge liquid and solid particles which are created from the sprayed additional liquid that is solidified due to a latent heat of evaporation,
- an inner container accommodated in the adiabatic container, the inner container being vertically movable relative to the adiabatic container, and being provided in its bottom part with a liquid communication valve,
- wherein the inner container is raised and the liquid communication valve is closed with substantially no liquid being present in the container, while creating the solid particles, and then the liquid communication valve is opened as well as the inner container is lowered when the created solid particles of a predetermined quantity are reserved in the inner container, thereby the initial charge liquid in the adiabatic container is mixed with the created solid particles so as to produce a slush fluid, and then the inner container is again raised so as to displace the slush fluid into the adiabatic container side through the liquid communication valve, so that the slush fluid can be transferred in a pressurized state.

13. An apparatus for producing a slush fluid in which a liquid and solid particles are mixed together, comprising;
- an adiabatic container charged with an initial charge liquid,
- a depressurizing means for vacuum-evacuating an inside of the adiabatic container to a value not higher than a triple point pressure of the initial charge liquid,
- a liquid supply means for spraying additional liquid in the form of fine particles into a phase part in the vacuum-evacuated adiabatic container,
- an agitating means for agitating a mixture of the initial charge liquid and solid particles which are created from the sprayed additional liquid that is solidified due to a latent heat of evaporation, and
- an inner container accommodated in the adiabatic container, the inner container being vertically movable relative to the adiabatic container, and being provided in its bottom part with a liquid communication valve and being provided therein with an agitating means, wherein the inner container is lowered with the liquid communication valve opened and then the liquid communication valve is closed in a condition that the initial charge liquid is present in the inner container, so that a gas-liquid separating heat-insulation material provided on the liquid surface of the liquid creates solid particles, which are mixed and agitated with the liquid together, so as to produce a slush fluid, and wherein, when the concentration of the slush fluid comes to a predetermined value, the liquid communication valve is opened while the inner container is raised so as to displace the slush fluid into the adiabatic container side, so that the slush fluid can be transferred in a pressurized state.

14. A process of producing a slush fluid according to claim 1, wherein a circulation is performed such that the vacuum-evacuated gas is cooled after being compressed so as to be condensated and fed into the liquid supply means.

15. A process of producing a slush fluid according to claim 1, wherein a circulation is performed such that the vacuum-evacuated gas having a low pressure and a low temperature is heated by a heat-exchanger and thereafter compressed by a compressor so as to become a gas having a high pressure and a medium temperature, which is heat-exchanged with the gas having a low pressure and a low temperature in the heat-exchanger so as to be condensated by being cooled and fed into the liquid supply means.

16. A process of producing a slush fluid according to claim 14, wherein impurity gas is removed from the vacuum-evacuated gas.

17. A process of producing a slush fluid according to claim 15, wherein impurity gas is removed from the vacuum-evacuated gas.

18. An apparatus for producing a slush fluid according to claim 7, wherein there are provided with a heat-exchanger for heating the gas having a low pressure and a low temperature, which has been obtained by vacuum-evacuating the inside of the adiabatic container by the depressurizing means, and a compressor for compressing the heated gas so as to obtain a gas having a high pressure and a middle temperature, the gas having a high pressure and a middle temperature being heat-exchanged with the gas having a low pressure and a low temperature in the heat-exchanger for cooling, thereby forming a circulation line for circulating the liquid condensated by the cooling into the liquid supply means.

19. An apparatus for producing a slush fluid according to claim 18, wherein an auxiliary cooling means for cooling the gas having a high pressure and a medium temperature is further provided in addition to the heat-exchanger.

20. An apparatus for producing a slush fluid according to claim 18, wherein an impurity gas removal means for removing impurity gas from the vacuum-evacuated gas is provided.

* * * * *